UNITED STATES PATENT OFFICE.

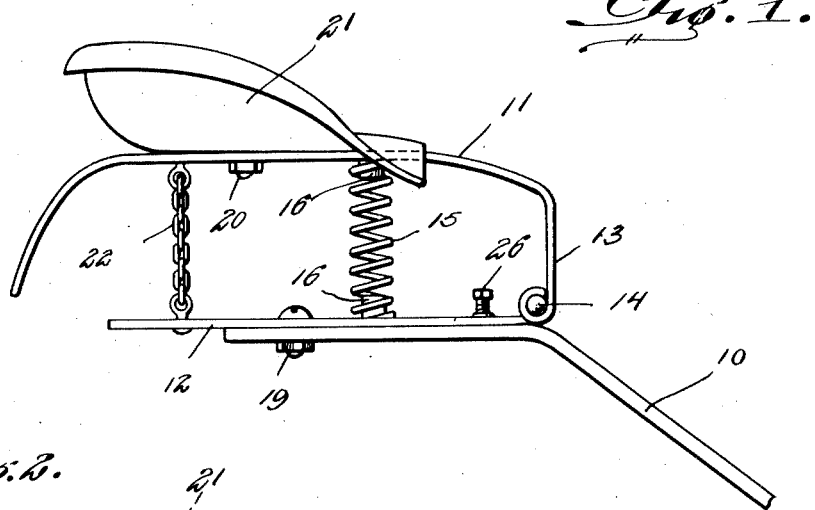
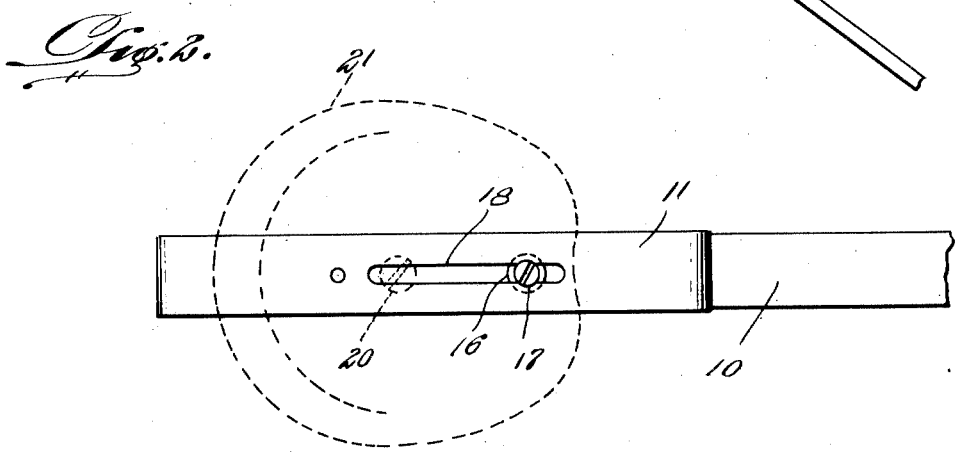
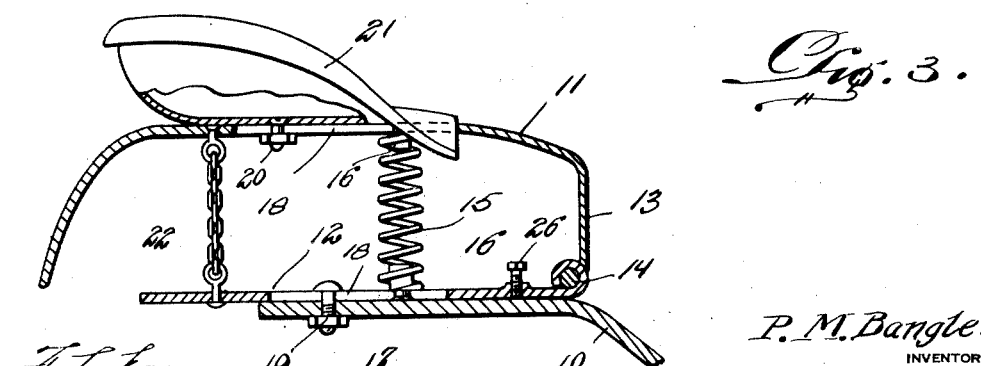

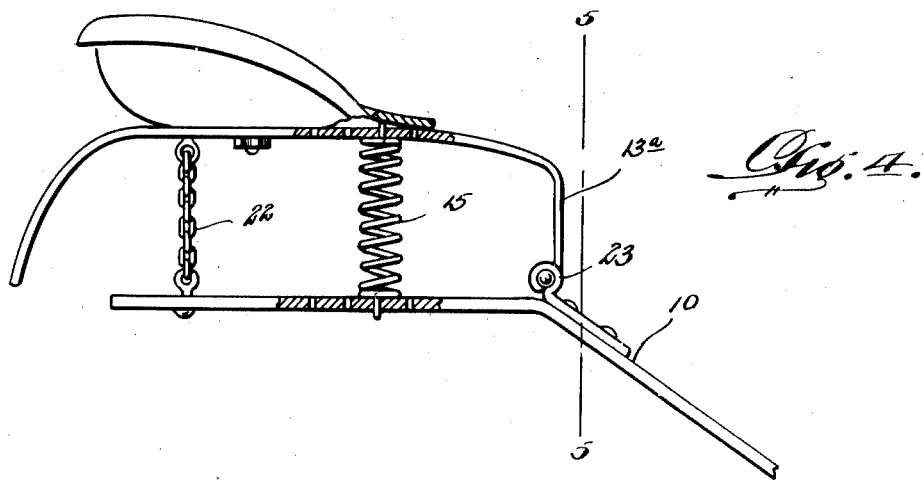
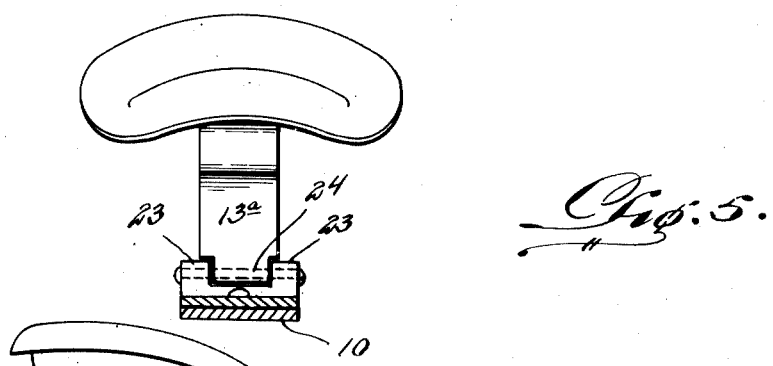
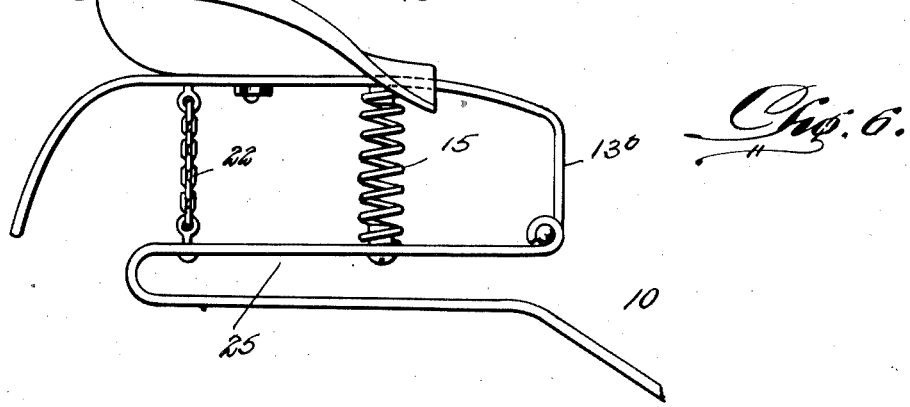

PAUL M. BANGLE, OF SAN DIMAS, CALIFORNIA.

SEAT.

1,390,865.  Specification of Letters Patent.  Patented Sept. 13, 1921.

Application filed January 29, 1921. Serial No. 440,929.

*To all whom it may concern:*

Be it known that I, PAUL M. BANGLE, a citizen of the United States, residing at San Dimas, in the county of Los Angeles and State of California, have invented new and useful Improvements in Seats, of which the following is a specification.

This invention relates to shock absorbers for vehicles and has for an object the provision of means by which a seat may be secured to a vehicle for the purpose of absorbing the shocks incident to travel over rough and uneven surfaces, the invention being especially designed for use in connection with tractors, or other farm machinery.

An object of the present invention is the provision of means which may be conveniently applied to tractors or other machines now in use for the purpose of absorbing shock to the tractor, or a novel form of seat supporting shock absorber of simple construction for use in the manufacture of new vehicles.

A further object is the provision of a device of the above character by means of which a seat may be adjustably secured in position so as to adapt it to persons of different height and render the operation of the machine less tiring.

Other objects and advantages of the invention will appear as the following description is read in connection with the accompanying drawings.

In the drawings:—

Figure 1 is a side elevation of the invention applied to the seat standard of a tractor or other agricultural implement, a seat being supported thereon.

Fig. 2 is a top plan view of the same with the seat shown by dotted lines.

Fig. 3 is a vertical longitudinal sectional view.

Fig. 4 is a side elevation showing the device as constructed for use in the manufacture of new vehicles.

Fig. 5 is a section on the line 5—5 of Fig. 4.

Fig. 6 is a view of a still further modified form of the invention.

Referring to the drawings in detail, and more especially to Figs. 1, 2 and 3, the form of the invention shown is designed for application to tractors or farming implements in use, without the necessity of in any manner changing the structure of the tractor or implement. The device is designed to be attached to the usual seat standard 10 and comprises a substantially rectangular frame which is formed of upper and lower horizontal bars 11 and 12 respectively, the forward ends of which are connected by a vertical bar 13. This last mentioned bar is preferably formed by a downward continuation of the upper bar 11 and is connected to the lower bar 12 by a hinge joint 14. As the rear ends of the bars 11 and 12 are spaced apart, relative movement is permitted of the bars 10 and 11.

In order to yieldingly hold the bars 10 and 11 separated, there is provided a coiled spring 15, whose opposite ends receive lugs 16 which are carried by bolts 17, the latter being adjusted in slots 18 which extend longitudinally of the bars 11 and 12. By changing the position of the spring 15 with respect to the front bar 13, the bars 11 and 12 may be relatively adjusted.

The frame is designed to be secured to the seat standard 10 by means of a bolt 19, which is ordinarily employed for the purpose of securing the seat to the standard. This bolt enters the slot 18 in the lower bar 12 and the latter may be adjusted forwardly and rearwardly to suit the convenience of the operator. By this means the legs of the operator may remain in a comfortable position so that the operation of the machine will be rendered less tiring. Extending through the slot 18 of the upper bar 11 is a bolt 20, by means of which the seat 21 which has been removed from the seat standard 10 may be secured, the said seat being adjustable in this slot so as to provide a further adjustment for the convenience of the operator.

The spring 16 will absorb shocks due to the unevenness of the surface over which the vehicle may be traveling and in order to prevent a rebound of the spring, the free ends of the bars 11 and 12 are connected by a snubber, herein shown in the form of a chain 22 which has its opposite ends connected in eyes provided in the respective bars 11 and 12.

To provide a further adjustment for the seat, the forward end of the lower bar 12 is formed with a threaded opening which receives an adjusting screw 26, the lower end of which engages the seat standard 10. By this means the seat 21 may be prevented from revolving about the bolts 19. This adjustment is especially important in connection with old vehicles in which the seat has assumed an acute forward or rearward incline, which renders the riding exceedingly uncomfortable.

The invention is susceptible of various changes in its form, proportions and minor details of construction, one of such changes residing in providing the seat standard 10 with spaced eyes 23, which are adapted to receive an eye 24 provided in the lower end of the vertical bar 13ª of the frame, as shown in Fig. 4 of the drawings. A pin passing through these eyes serves to hingedly connect the lower end of the bar 13ª to the seat standard 10, the horizontal extremity of this standard taking the place of the lower horizontal bar 12 shown in the previous figures of the drawings. The shock absorbing spring 15 and snubber 22 may thus be positioned in the usual manner and the seat 21 secured after the manner previously described. This structure is especially designed for use in the manufacture of new machines.

In Fig. 6 there is illustrated a further modified form of the invention in which the seat standard 10 is provided with a spring extension 25 which extends forwardly and has secured thereto after the manner described in connection with Figs. 4 and 5 of the drawings, the vertical bar 13ᵇ of the seat supporting frame. This is also a special construction for use in the manufacture of new vehicles.

Various other changes may be made in the form, proportions and minor details of construction and the right is herein reserved to make such changes as properly fall within the scope of the appended claim.

Having described the invention what is claimed is:—

The combination with a seat standard, of a bar provided with a threaded opening and having an elongated slot formed therein, a substantially U-shaped bar hingedly connected to one end of the first mentioned bar and having an elongated slot formed therein, a chain connected to said bars, bolts slidably mounted in said slots, lugs carried by said bolts, a coil spring surrounding said lugs and exerting a pressure between said bars, an adjusting screw engaging the threaded opening in the first mentioned bar, a bolt passing through the slot in the first mentioned bar and secured to said standard, a seat, and a bolt secured to said seat and engaging said slot in the last mentioned bar.

In testimony whereof I affix my signature.

PAUL M. BANGLE.